(12) United States Patent
Sugawara

(10) Patent No.: US 9,716,426 B2
(45) Date of Patent: Jul. 25, 2017

(54) SWITCHING POWER SUPPLY CIRCUIT

(71) Applicant: FUJI ELECTRIC CO., LTD., Kawasaki (JP)

(72) Inventor: Takato Sugawara, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/942,855

(22) Filed: Nov. 16, 2015

(65) Prior Publication Data
US 2016/0181942 A1    Jun. 23, 2016

(30) Foreign Application Priority Data

Dec. 19, 2014 (JP) .................................. 2014-257266

(51) Int. Cl.
H02M 3/156 (2006.01)
H02M 3/158 (2006.01)
H02M 1/42 (2007.01)
H02M 1/00 (2006.01)

(52) U.S. Cl.
CPC ......... *H02M 1/4225* (2013.01); *H02M 3/156* (2013.01); *H02M 3/158* (2013.01); *H02M 3/1588* (2013.01); *H02M 2001/0032* (2013.01); *Y02B 70/126* (2013.01); *Y02B 70/16* (2013.01)

(58) Field of Classification Search
CPC ..... H02M 3/156; H02M 3/158; H02M 3/1588
See application file for complete search history.

(56) References Cited

U.S. PATENT DOCUMENTS

| 6,208,148 | B1* | 3/2001 | Yuen | H02J 1/10 324/433 |
| 8,659,271 | B2* | 2/2014 | Chu | H02M 1/4208 323/207 |
| 2006/0043943 | A1* | 3/2006 | Huang | H02M 3/1584 323/222 |
| 2010/0165683 | A1* | 7/2010 | Sugawara | H02M 1/4225 363/126 |
| 2013/0121047 | A1 | 5/2013 | Lin | |

FOREIGN PATENT DOCUMENTS

| JP | S59-53081 A | 3/1984 |
| JP | H06-153496 A | 5/1994 |
| JP | 2005-204379 A | 7/2005 |

* cited by examiner

*Primary Examiner* — Matthew Nguyen
*Assistant Examiner* — Ishrat Jamali
(74) *Attorney, Agent, or Firm* — Rabin & Berdo, P.C.

(57) ABSTRACT

A lamp oscillator which outputs a sawtooth wave signal to be compared with an error signal of an output voltage in order to generate a PWM signal. The oscillator includes a first charging current changing circuit, in which a current amplifier converts a differential voltage between the error signal and a reference voltage into a current and outputs the converted current. When the load of a switching power supply circuit is heavy, a capacitor is charged with a constant current and generates a sawtooth wave signal having a predetermined slope. During a light load, the first charging current changing circuit adds the current, which increases as the load becomes lighter, to the current to thereby make the slope of the sawtooth wave signal steeper.

7 Claims, 15 Drawing Sheets

SWITCHING POWER SUPPLY CIRCUIT

CROSS-REFERENCE TO RELATED APPLICATIONS

This application claims the priority, under 35 U.S.C. 119, of corresponding Japanese Patent Application No. JP PA 2014-257266, filed Dec. 19, 2014, the entire content of which is hereby incorporated by reference.

BACKGROUND OF THE INVENTION

1. Field of the Invention

The present invention relates to a switching power supply circuit. Particularly, it relates to a switching power supply circuit provided with a power factor controller circuit which can stably control switching operation within a wide input voltage range.

2. Description of the Background Art

In lots of electronic devices supplied with commercial alternating current (AC) power supplies (in the range of from AC 100 V to 240 V), switching power supply circuits are used in order to obtain direct current (DC) power supplies driving internal electronic circuits. Therefore, a rectifier circuit for converting a commercial AC power supply into a direct current is required in such a switching power supply circuit. A current flows into a smoothing capacitor connected in a subsequent stage to the rectifier circuit only when an input voltage reaches the vicinity of the peak exceeding the voltage of the smoothing capacitor. Therefore, there is a problem that high frequency current and voltage components occur as high frequency noise sources and a power factor deteriorates.

The power factor means a value which is obtained by dividing input effective power Pi (W) by apparent power. The input effective power Pi (W) is the product of an input voltage and an in-phase component of an input current in an AC circuit. The apparent power is the product of an effective value of the input voltage and an effective value of the input current. The effective power is obtained by multiplying the apparent power by a coefficient (power factor) depending on a load. When a simple resistance load is connected to AC 100 V, a voltage waveform and a current waveform are in phase with each other. Therefore, the power factor becomes 1. However, in a switching power supply, a current phase may delay with respect to a voltage phase due to another load factor than the resistance load. Thus, a part of the effective power may lack correspondingly to the delay. For that reason, it is necessary to prevent deterioration of the power factor by means of a power factor controller (PFC) circuit to thereby suppress the decrease of the effective power or the useless increase of the apparent power for obtaining necessary effective power. At the same time, it is necessary to suppress high frequency noise.

The power factor controller circuit is a circuit which makes an AC input current waveform in phase with an AC input voltage waveform rectified by the rectifier circuit in the switching power supply circuit to thereby improve the power factor to be close to 1. The power factor controller circuit further controls a high-frequency current or voltage which may lead to generation of harmful EMI (Electro-Magnetic Interference) or breakdown of a device.

FIG. 9 is a circuit diagram showing a switching power supply circuit using a background-art power factor controller circuit. FIG. 10 is a circuit diagram schematically showing the configuration of a background-art lamp oscillator. Incidentally, in the following description, the same symbols may be used for the names of terminals and voltages, signals, etc. in the terminals respectively.

As shown in FIG. 9, in the switching power supply circuit, an AC input voltage is full-wave rectified by a full-wave rectifier 1, and one end of a capacitor 2 is connected to an output end of the full-wave rectifier 1 so that a high frequency component caused by switching operation can be removed by the capacitor 2. In addition, one end of a primary-side inductor 3 of a transformer T serving as an inductance element is connected to the output end of the full-wave rectifier 1. A step-up circuit including an MOSFET (Metal-Oxide Semiconductor Field Effect Transistor, hereinafter simply referred to as output transistor) 4 serving as a switching element, a diode 5 and a capacitor 6 is provided between the other end of the primary-side inductor 3 of the transformer T and a reference potential (ground potential). Incidentally, the diode 5 and the capacitor 6 form a DC voltage generating portion which rectifies and smoothes a current from the primary-side inductor 3 of the transformer T and obtains a predetermined DC output voltage. A rectified voltage outputted from the full-wave rectifier 1 is stepped up and rectified by the aforementioned step-up circuit, so that, for example, a DC output voltage of about 400 V can be supplied to a load (not shown) connected between an output terminal 7 and the ground.

A power factor controller circuit 100 is constituted by an integrated circuit in which various functions are provided integrally. The power factor controller circuit 100 performs control called critical control system to turn ON the output transistor 4 when the current of the primary-side inductor 3 of the transformer T becomes zero in an OFF-time of the output transistor 4. The critical control system is used in an electronic device consuming small electric power, for example, to be not higher than about 250 W.

The power factor controller circuit 100 has an FB terminal, an IS terminal, an OUT terminal, a ZCD (Zero-Crossing Detection) terminal, an RT terminal, and a COMP terminal as external connection terminals. The FB terminal is connected to a connection point between resistors R4 and R5 which are connected in series between the output terminal 7 and the ground. The FB terminal serves as a feedback signal inputting terminal for feeding back the output voltage. A current detecting resistor R3 is connected between the IS terminal and the ground. The IS terminal serves as a terminal for converting a current flowing into the current detecting resistor R3 into a voltage and detecting a current flowing into the output transistor 4. The OUT terminal serves as a terminal for outputting a signal driving a gate of the MOSFET constituting the output transistor 4 so that ON/OFF of the MOSFET can be controlled in accordance with the output from the OUT terminal. The ZCD terminal is connected to one end of a secondary-side inductor 8 through a resistor R2. The other end of the secondary-side inductor 8 of the transformer T is grounded. The ZCD terminal serves as a terminal for inputting a zero-cross signal generated by the secondary-side inductor 8 of the transformer T. The RT terminal serves as a resistor connecting terminal determining an oscillation waveform. A timing resistor R1, of which one end is grounded is connected to the RT terminal. The RT terminal is a terminal for generating a sawtooth wave signal having a slope corresponding to a resistance value of the timing resistor R1. The COMP terminal serves as a terminal for connecting a phase compensation element. The COMP terminal is grounded through a capacitor C1. A series circuit between a resistor R6 and a capacitor C2 is connected in parallel with the capacitor C1. The capacitors C1 and C2 and the resistor R6 form a phase compensation circuit. In addition thereto, the power factor controller circuit 100 is also provided with a power supply voltage input VCC terminal, a ground GND terminal, etc., which are not shown.

An error amplifier 11 which amplifies and outputs a difference between a detection value of an output voltage inputted to the FB terminal and a reference voltage Vref, and a PWM (Pulse Width Modulation) comparator 12 are provided internally in the power factor controller circuit 100. Moreover, the power factor controller circuit 100 has a lamp oscillator 13, OR circuits 14a and 14b, an RS flip-flop 15, a ZCD (Zero-Crossing Detection) comparator 16, a one-shot circuit 17, and a restart timer 18. The power factor controller circuit 100 further has an OVP (Overvoltage Protection) comparator 19 used for protecting an overvoltage, and an OCP (OverCurrent Protection) comparator 20 used for detecting an overcurrent.

A non-inverting input of the error amplifier 11 of the power factor controller circuit 100 receives the reference voltage Vref. The FB terminal is connected to an inverting input of the error amplifier 11. An output of the error amplifier 11 is connected to the COMP terminal and an inverting input of the PWM comparator 12. An output of the PWM comparator 12 is connected to a reset terminal of the RS flip-flop 15 through the OR circuit 14b. The lamp oscillator 13 is connected to the external timing resistor R1 through the RT terminal and generates a sawtooth wave signal S1 having a slope corresponding to the resistance value of the timing resistor R1. The sawtooth wave signal is supplied to a non-inverting input of the PWM comparator 12.

A non-inverting input side of the ZCD comparator 16 receives a reference voltage Vzcd. An inverting input side of the ZCD comparator 16 is connected to the ZCD terminal. An output of the ZCD comparator 16 is connected to the one-shot circuit 17 and the restart timer 18. An output of the one-shot circuit 17 and an output of the restart timer 18 are supplied to a set terminal of the RS flip-flop 15 through the OR circuit 14a. An output signal S0 of the RS flip-flop 15 is supplied to the gate terminal of the output transistor 4 through the OUT terminal.

In addition, an inverting input side of the OVP comparator 19 receives a reference voltage Vovp. A non-inverting input side of the OVP comparator 19 is connected to the FB terminal. An output of the OVP comparator 19 is connected to the reset terminal of the RS flip-flop 15 through the OR circuit 14b. Further, an inverting input side of the OCP comparator 20 receives a reference voltage Vocp. A non-inverting input side of the OCP comparator 20 is connected to the IS terminal. An output of the OCP comparator 20 is connected to the reset terminal of the RS flip-flop 15 through the OR circuit 14b.

Here, as shown in FIG. 10, the lamp oscillator 13 has an operational amplifier 1301, a reference voltage source 1302 and an N channel MOSFET 1303, which form a circuit outputting a constant voltage to the RT terminal to apply a constant current to the timing resistor R1. That is, two inputs of the operational amplifier 1301 are virtually short-circuited to apply, to the RT terminal, the constant voltage outputted from the reference voltage source 1302, and a current obtained by dividing a difference between the applied constant voltage and a voltage outputted from a reference voltage source 1309, which will be described later, by the resistance value of the timing resistor R1 flows into the timing resistor R1. The constant current flowing into the timing resistor R1 is returned as a current i1 by a current mirror circuit constituted by P channel MOSFETs 1304 and 1305. The current i1 is supplied to a circuit which has a P channel MOSFET 1306, an inverter 1307, an N channel MOSFET 1308, the reference voltage source 1309, and a capacitor 1310. An input of the inverter 1307 is connected to an S0 terminal to which the output signal S0 of the RS flip-flop 15 is supplied. An output of the inverter 1307 is connected to a gate terminal of the MOSFET 1306 and a gate terminal of the MOSFET 1308. A drain terminal of the MOSFET 1306 and a drain terminal of the MOSFET 1308 are connected to one end of the capacitor 1310 and an S1 terminal. The other end of the capacitor 1310 is connected to a connection point between a source terminal of the MOSFET 1308 and the reference voltage source 1309.

In the lamp oscillator 13, the capacitor 1310 is charged with the constant current i1 by the MOSFET 1306 when the output transistor 4 is ON (the output signal S0 is in an H (High) level) in response to the output signal S0 of the RS flip-flop 15. On the other hand, when the output transistor 4 turns OFF (the output signal S0 turns to an L (Low) level), electric charges stored in the capacitor 1310 are rapidly discharged by the MOSFET 1308. In this manner, the lamp oscillator 13 outputs, to the terminal S1, the sawtooth wave signal S1 having the slope depending on the timing resistor R1 with reference to the voltage of the reference voltage source 1309.

Next, operation of the switching power supply circuit having the aforementioned configuration will be described in detail.

FIG. 11 is a view for explaining an operation when the RS flip-flop is set. FIG. 12 is a view for explaining an operation when the RS flip-flop is reset. FIG. 13 is a view for explaining the relation between the change of an error signal Verr caused by the change of a load and a signal outputted from the OUT terminal. In addition, FIG. 14 is a view for explaining factors causing the change of the error signal during a light load. FIG. 15 is a view for explaining the influence caused by the change of the error signal during the light load.

The ZCD comparator 16 detects a timing at which an inductor current flowing into the primary-side inductor 3 of the transformer T in the step-up circuit becomes zero. A voltage value of the ZCD terminal is in an L level when the inductor current flowing into the inductor 3 is increasing or when the inductor current is zero. On the other hand, the voltage value of the ZCD terminal is in an H level when the inductor current is decreasing. When the ZCD comparator 16 monitors the voltage of the ZCD terminal and detects the falling of the voltage, i.e. detects zero as the inductor current, the output of the ZCD comparator 16 turns to an H level, as shown in FIG. 11. Upon reception of the H level signal, the one-shot circuit 17 outputs a one-shot pulse as a set signal to the RS flip-flop 15 through the OR circuit 14a. In this manner, the RS flip-flop 15 outputs and supplies an H level output signal S0 to the gate terminal of the output transistor 4 through the OUT terminal to thereby turn ON the output transistor 4. On this occasion, the output signal of the ZCD comparator 16 triggers the restart timer 18. During normal ON/OFF operation of the output transistor 4, the restart timer 18 is triggered by a next output signal of the ZCD comparator 16 before the time is out. Accordingly, the restart timer 18 maintains output of an L level signal.

Here, when, for example, the OVP comparator 19 detects an overvoltage of the output voltage at a time instant t1, the RS flip-flop 15 changes the reset signal to an H level and suspends switching operation of the output transistor 4 (to keep the output transistor 4 OFF) on and after the time instant t1. Even in this case, the restart timer 18 is triggered to start to count time (time instant t2) when the ZCD comparator 16 detects the falling of the voltage of the ZCD terminal. When the time is out (time instant t3) during the suspension of the switching operation in the output transistor 4, the restart timer 18 outputs an H level signal. On this occasion, the RS flip-flop 15 is operating with reset priority due to the reset signal inputted from the OVP comparator 19. Accordingly, the output signal S0 is kept at the L level as it is.

When the output voltage is then resumed normally and the output of the OVP comparator 19 turns to an L level at a time instant t4, the RS flip-flop 15 is set by the H level output signal of the restart timer 18 and outputs an H level signal to the OUT terminal. Next, when the output transistor 4 turns OFF and the voltage of the ZCD terminal rises at a time instant t5, the output signal of the restart timer 18 turns to an L level and the restart timer 18 is triggered to start to count time at the falling of a next voltage of the ZCD terminal (time instant t6).

The output signal S0 of the RS flip-flop 15 is also inputted to the lamp oscillator 13. In the lamp oscillator 13, at the same timing as the timing when the output transistor 4 turns ON, the MOSFET 1306 turns ON to start to charge the capacitor 1310 with the current i1 so that the capacitor 1310 can start to generate the sawtooth wave signal S1. When the output transistor 4 turns OFF, the MOSFET 1308 turns ON to discharge electric charges of the capacitor 1310 so that the lamp oscillator 13 can suspend generation of the sawtooth wave signal S1. Thus, in sync with the ON/OFF of the output transistor 4, the lamp oscillator 13 generates the sawtooth wave signal S1 as shown in FIG. 12. The sawtooth wave signal S1 is compared with an error signal Verr by the PWM comparator 12 and the reset signal of the RS flip-flop 15 is generated.

When a difference between a feedback voltage, in which a DC voltage outputted from the output terminal 7 is divided by the resistors R4 and R5 and fed back to the FB terminal, and the reference voltage Vref is amplified by the error amplifier 11, an error signal Verr is generated. In the PWM comparator 12, the error signal Verr and the sawtooth wave signal S1 from the lamp oscillator 13 are compared with each other, and a reset signal is outputted to the RS flip-flop 15 when the sawtooth wave signal S1 reaches the error signal Verr. Thus, the output signal S0 of the RS flip-flop 15 turns to an L level. When the L level output signal S0 is outputted from the OUT terminal, the output transistor 4 turns OFF. Incidentally, the change of an inductor current Iind flowing into the primary-side inductor 3 of the transformer T, the change of the voltage of the ZCD terminal, and the change of a drain-source voltage Vds of the output transistor 4 are also shown correspondingly to the voltage of the OUT terminal in FIG. 12.

The error signal Verr expresses excess or shortage of electric power outputted from the output terminal 7. The error signal Verr fluctuates vertically due to the magnitude of a load. That is, the error signal Verr becomes high in the case where the load is heavy, and becomes low in the case where the load is light. The slope of the sawtooth wave signal S1 is constant. Accordingly, as shown in FIG. 13, the time until the sawtooth wave signal S1 reaches the error signal Verr is long in the case where the load is heavy. Therefore, a timing when the reset signal is outputted to the RS flip-flop 15 is delayed correspondingly. Thus, the ON width (ON-time) of the output transistor 4 becomes wide so that a large amount of energy can be sent by the output terminal 7. On the other hand, the time until the sawtooth wave signal S1 reaches the error signal Verr is short in the case where the load is light. Consequently, the ON width of the output transistor 4 becomes narrow.

When the magnitude of the load connected to the output terminal 7 of the switching power supply circuit is constant here, the error signal Verr is also constant basically. The ON width of the output transistor 4 corresponds to a time required for the sawtooth wave signal S1 to start from the reference value (reference voltage 1309) and reach the error signal Verr. Accordingly, when the error signal Verr is constant, the ON width can be controlled fixedly.

However, since the input of the switching power supply circuit is an AC voltage, the voltage at the opposite ends of the primary-side inductor 3 changes due to a phase angle of the AC voltage. Therefore, the slope of the inductor current Iind flowing into the primary-side inductor 3 of the transformer T changes depending on the input voltage. As a result, the peak value of the inductor current (i.e. a current value at a timing when the output transistor 4 turns OFF) becomes an AC waveform.

In addition, when the AC input voltage is converted into a DC output voltage, a ripple voltage depending on the cycle of the AC input occurs in the output voltage. The ripple voltage increases as the capacitance value of the capacitor 6 provided in the output terminal 7 decreases. Recently, with the reduction of the price of an electronic device, the capacitance value of the capacitor 6 provided in the output terminal 7 tends to decrease in order to reduce the cost of a power supply, and the ripple voltage therefore tends to increase. When the ripple voltage increases, a ripple voltage of the error signal Verr outputted from the error amplifier 11 also increases.

That is, as shown in FIG. 14, when a voltage Vac full-wave rectified by the full-wave rectifier 1 is inputted, a current Iac flowing into the primary-side inductor 3 of the transformer T and the capacitor 6 changes in a cycle twice as fast as the voltage Vac, and a charging voltage of the capacitor 6 receiving the current Iac, that is, the output voltage also changes in the cycle twice as fast as the voltage Vac. When the change of the output voltage is inputted to the error amplifier 11 through the FB terminal, the error amplifier 11 outputs an error signal Verr having an unstable waveform fluctuating with respect to an average value. Therefore, the PWM comparator 12 compares the sawtooth wave signal S1 from the lamp oscillator 13 and the unstable error signal Verr with each other, and generates a reset signal for turning OFF the output transistor 4. In this case, normal operation may be performed to generate a reset signal to output an output signal S0 for turning ON/OFF the output transistor 4 to the OUT terminal or abnormal operation may be performed to continuously output a reset signal so as not to output an output signal S0 to the OUT terminal even when the ZCD terminal has turned to an L level.

This is conspicuous when the error signal Verr is low during a light load and control is made to narrow the ON width of the output transistor 4 and reduce the energy to be sent to the output terminal 7. In this case, the error signal Verr and a lower limit (reference voltage 1309) of the sawtooth wave signal S1 are close to each other as shown in FIG. 15. Therefore, when an AC component is superimposed on the error signal Verr, the error signal Verr may be lower than the lower limit of the sawtooth wave signal S1. In the period in which the error signal Verr is lower than the lower limit of the sawtooth wave signal S1, the output of the PWM comparator 12 is always in an H level and the reset signal is sent to the RS flip-flop 15 continuously. Accordingly, the switching power supply circuit suspends the switching operation. Thus, the period in which the switching operation is being performed and the period in which the switching operation is being suspended are generated. The switching power supply circuit operates intermittently. When the cycle of the intermittent operation is in an audible range, the operation may be an unstable burst operation, causing noise.

Since one switching power supply circuit is used to support AC input voltages different from one country to another, the power factor controller circuit has to output a constant voltage from a wide input voltage range of from AC 90 V to AC 264 V. On this occasion, when a gain is designed to be high enough to take a sufficiently large load from a low input voltage, the gain may be too high to perform stable operation under a low load with a high input voltage. It is therefore difficult to perform stable operation in the wide input voltage range. Therefore, for example, as described in US Unexamined Patent Application Publication No. 2013/0121047, there is generally used a method in which feed-forward control is applied to the input voltage to increase the gain when the input voltage is low and to reduce the gain when the input voltage is high so that a switching power supply circuit can be operated stably within a wide input voltage range.

However, in the feed-forward control on the input voltage for eliminating unstable operation, the input voltage has to be monitored. Therefore, there is a problem that standby power may deteriorate due to losses in the resistors dividing the input voltage and the number of pins in a control IC of the power factor controller circuit may increase for monitoring the input voltage.

BRIEF SUMMARY OF THE INVENTION

The invention has been accomplished in consideration of the foregoing problem. The invention provides a switching power supply circuit from which unstable operation caused by an AC component superimposed on an error signal can be eliminated while a wide input voltage range can be supported without using feed-forward control on an input voltage.

In order to solve the forgoing problem, according to the invention, there is provided a switching power supply circuit which obtains a predetermined DC output voltage from an AC power supply. The switching power supply circuit includes: a full-wave rectifier which full-wave rectifies the AC power supply; a step-up inductance element of which one end is connected to an output terminal of the full-wave rectifier; a switching element which is connected between the other end of the inductance element and a reference potential; a DC voltage generating portion which rectifies and smoothes a current from the other end of the inductance element and generates the predetermined DC output voltage; and a power factor controller circuit which controls an ON time of the switching element based on an error signal obtained by amplifying a differential voltage between a feedback voltage indicating the magnitude of the DC output voltage and a first reference voltage. Here, the power factor controller circuit has an oscillator which generates a sawtooth wave signal to be compared with the error signal in order to control the ON time, and the oscillator has a charging current changing circuit which increases a charging current generating the sawtooth wave signal as the error signal decreases so that the sawtooth wave signal can be changed to have a steep slope.

According to such a switching power supply circuit, the charging current changing circuit makes change to increase the charging current of the sawtooth wave signal of the oscillator in proportion to the decrease of an error amplification signal so that the slope of the sawtooth wave signal can be made steep. Thus, the error signal can be kept at a high voltage in the range in which the error amplification signal decreases so that control during a light load can be made stable.

In the switching power supply circuit having the aforementioned configuration, the oscillator has the charging current changing circuit. Accordingly, there is an advantage that it is possible to make the slope of the sawtooth wave signal steep enough to keep the error signal at a high voltage when the load is light, and it is possible to improve unstable operation caused by an AC component superimposed on the error signal when the input voltage is high.

In addition, according to the switching power supply circuit, the configuration for detecting the input voltage can be dispensed with so that switching power supply can be controlled stably in a wide input voltage range without increasing standby power caused by the configuration for detecting the input voltage and without increasing the number of pins in the control IC.

DETAILED DESCRIPTION OF THE INVENTION

Embodiments of the invention will be described below in detail with reference to the drawings.

Figure 1:
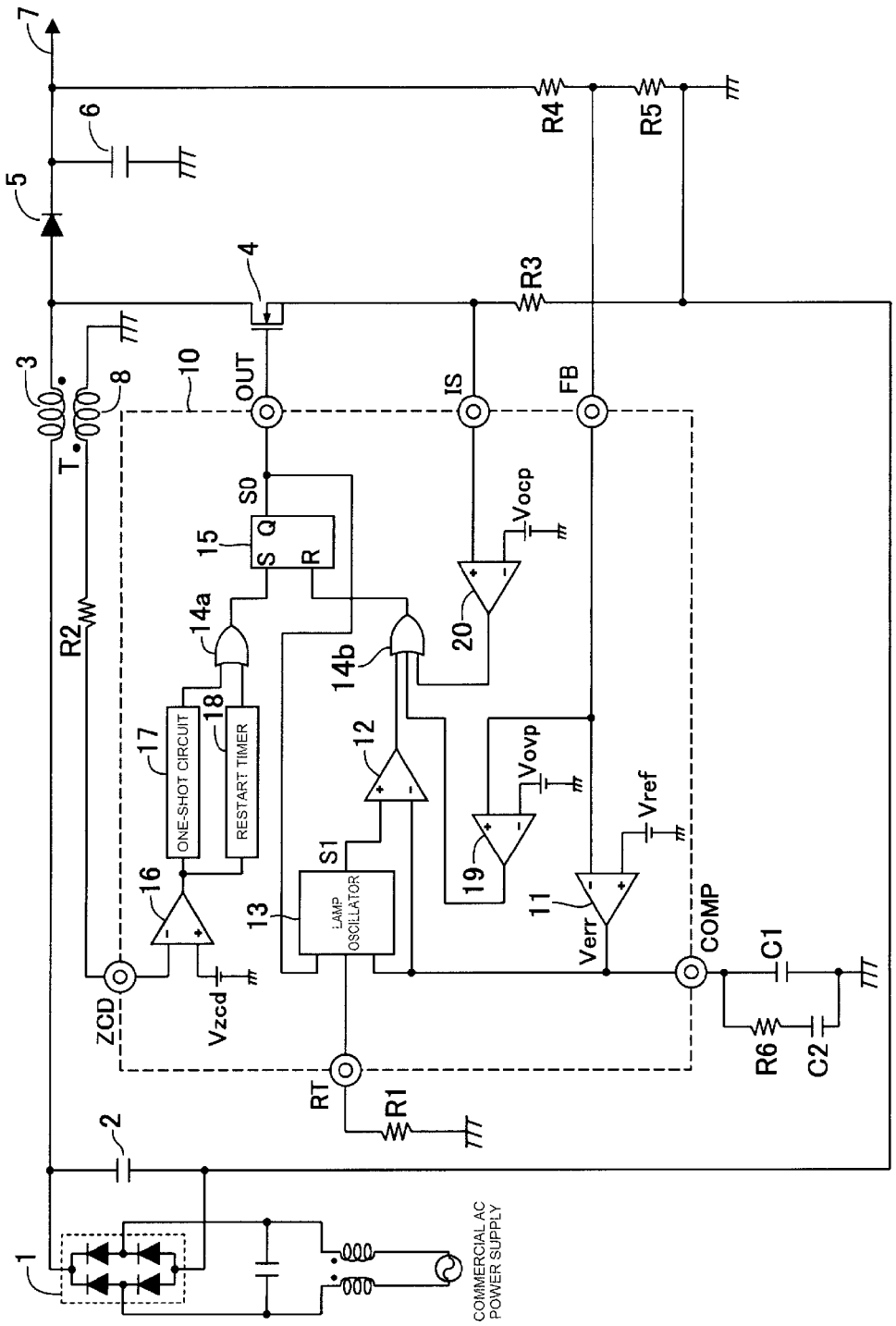
FIG. 1 is a circuit diagram showing a switching power supply circuit according to the invention.
Figure 2:
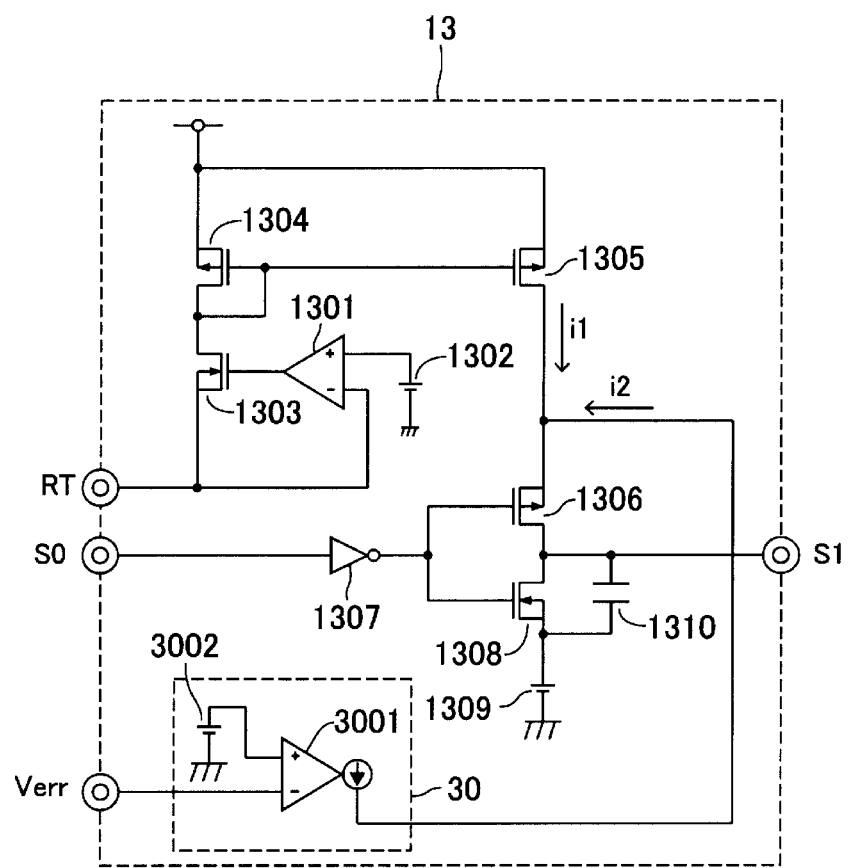
FIG. 2 is a circuit diagram showing a configuration example of a lamp oscillator of the switching power supply circuit according to a first embodiment.
Figure 3:
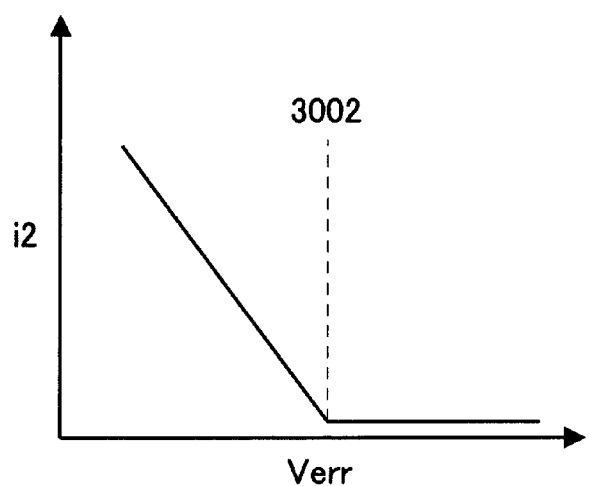
FIG. 3 is a graph showing a characteristic of a charging current changing circuit of the lamp oscillator.
Figure 4:
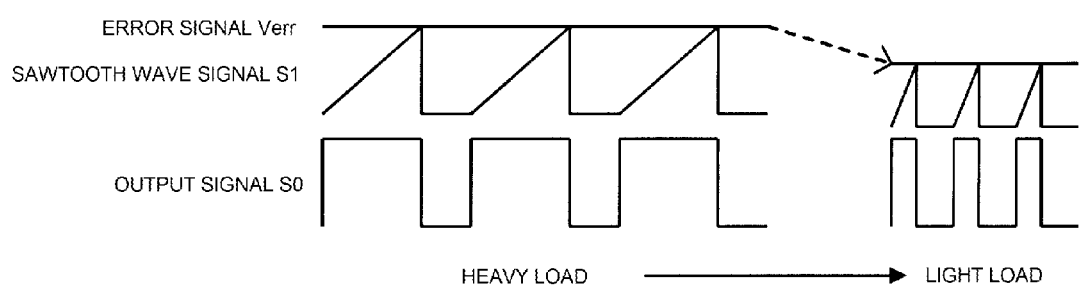
FIG. 4 is a view for explaining the change of a sawtooth wave signal caused by the change of a load.
Figure 5:
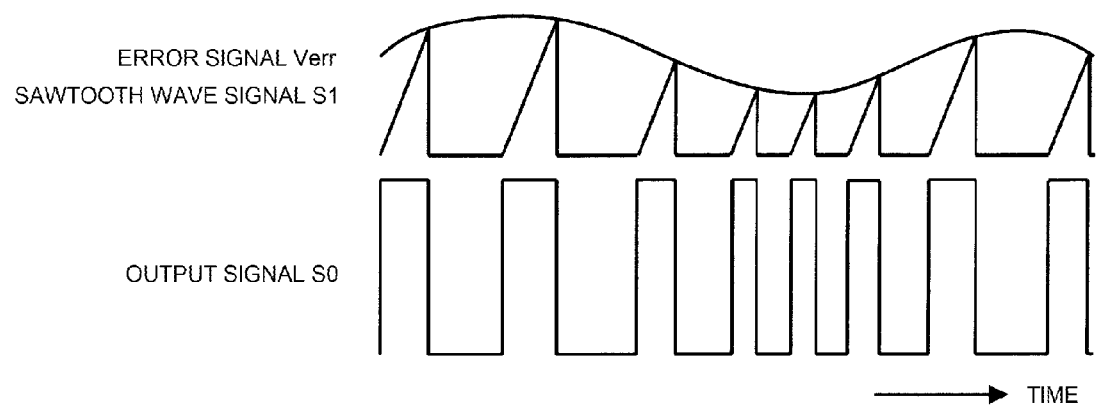
FIG. 5 is a view for explaining the influence caused by the change of an error signal during a light load.

FIG. 1 is a circuit diagram showing a switching power supply circuit according to the invention. FIG. 2 is a circuit diagram showing a configuration example of a lamp oscillator of the switching power supply circuit according to a first embodiment. FIG. 3 is a graph showing a characteristic of a charging current changing circuit of the lamp oscillator. FIG. 4 is a view for explaining the change of a sawtooth wave signal caused by the change of a load. FIG. 5 is a view for explaining the influence caused by the change of an error signal during a light load. Incidentally, the same symbols will be used hereinafter for constituent elements, terminal names, signal names, etc. corresponding to those of the background-art circuit shown in FIG. 9 respectively, and duplicate description thereof will be omitted.

Figure 9:
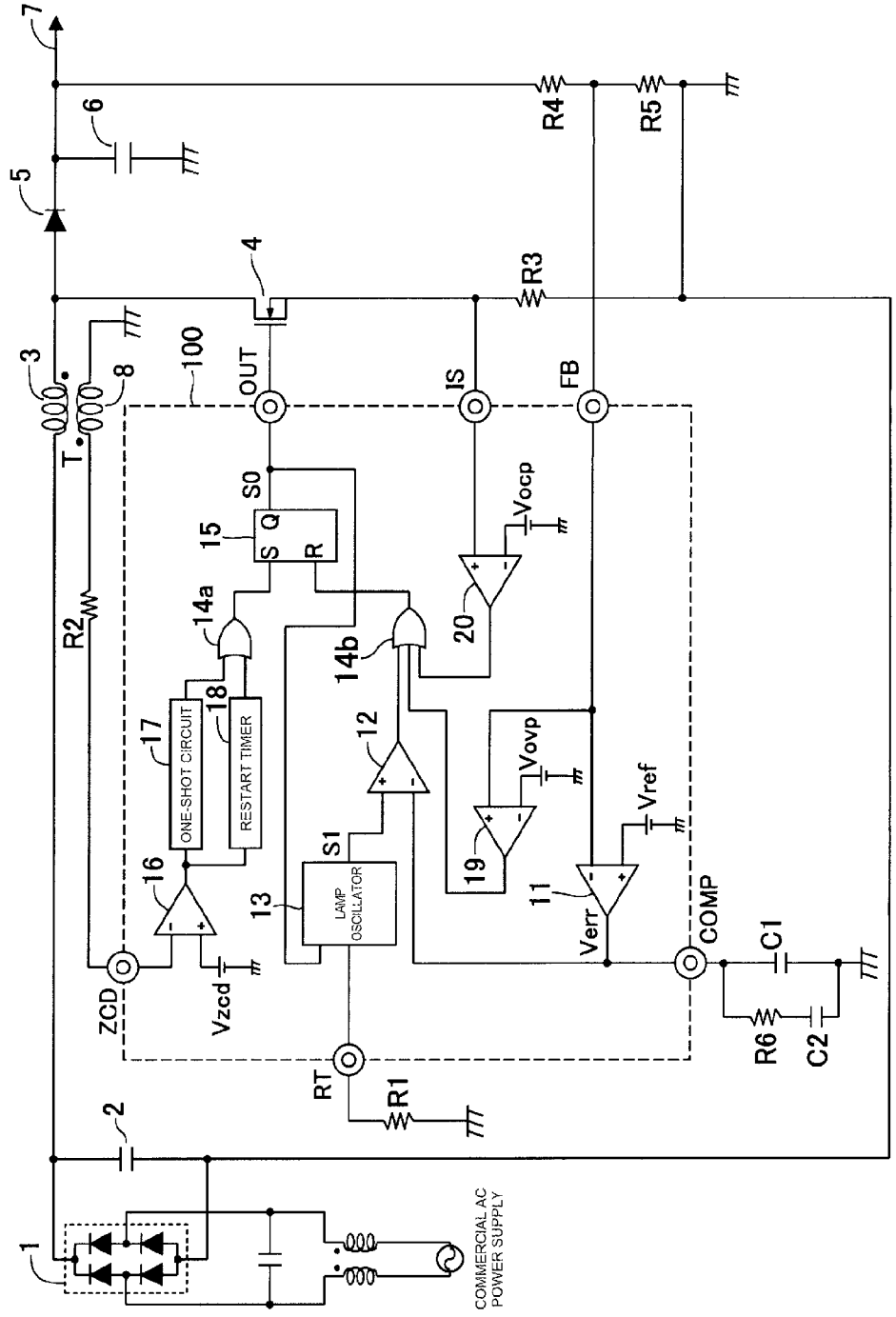
FIG. 9 is a circuit diagram showing a switching power supply circuit using a background-art power factor controller circuit.

In the switching power supply circuit according to the invention, a power factor controller circuit 10 is different from the power factor controller circuit 100 of the switching power supply circuit in the background-art example of FIG. 9 as follows. That is, the power factor controller circuit 10 has a configuration in which an error signal Verr outputted by an error amplifier 11 is inputted to a lamp oscillator 13. Accordingly, a circuit which includes a ZCD comparator 16, a one-shot circuit 17, a restart timer 18 and an OR circuit 14a and which generates a set signal for controlling an output transistor 4 to turn ON is the same as that in the power factor controller circuit 100. In addition, a circuit which includes the error amplifier 11, a PWM comparator 12, the lamp oscillator 13 and an OR circuit 14b and which generates a reset signal for controlling the output transistor 4 to turn OFF is also the same as that in the power factor controller circuit 100 except the internal configuration of the lamp oscillator 13. An RS flip-flop 15 generating an output signal S0, an OVP comparator 19 and an OCP comparator 20 are also the same as those in the power factor controller circuit 100.

Figure 10:
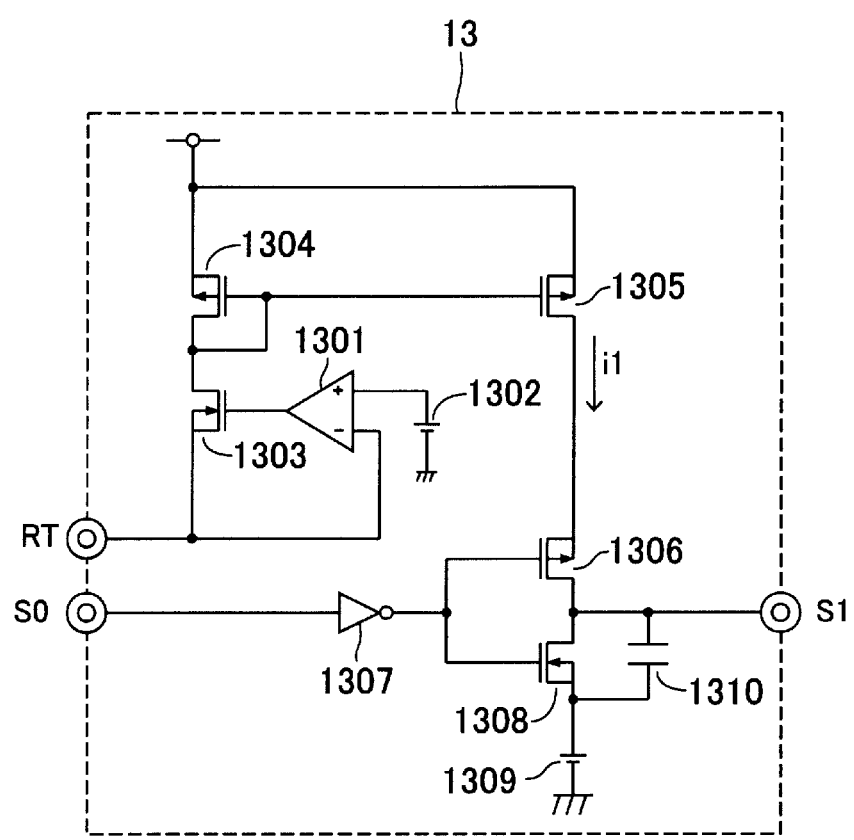
FIG. 10 is a circuit diagram schematically showing the configuration of a background-art lamp oscillator.
Figure 11:
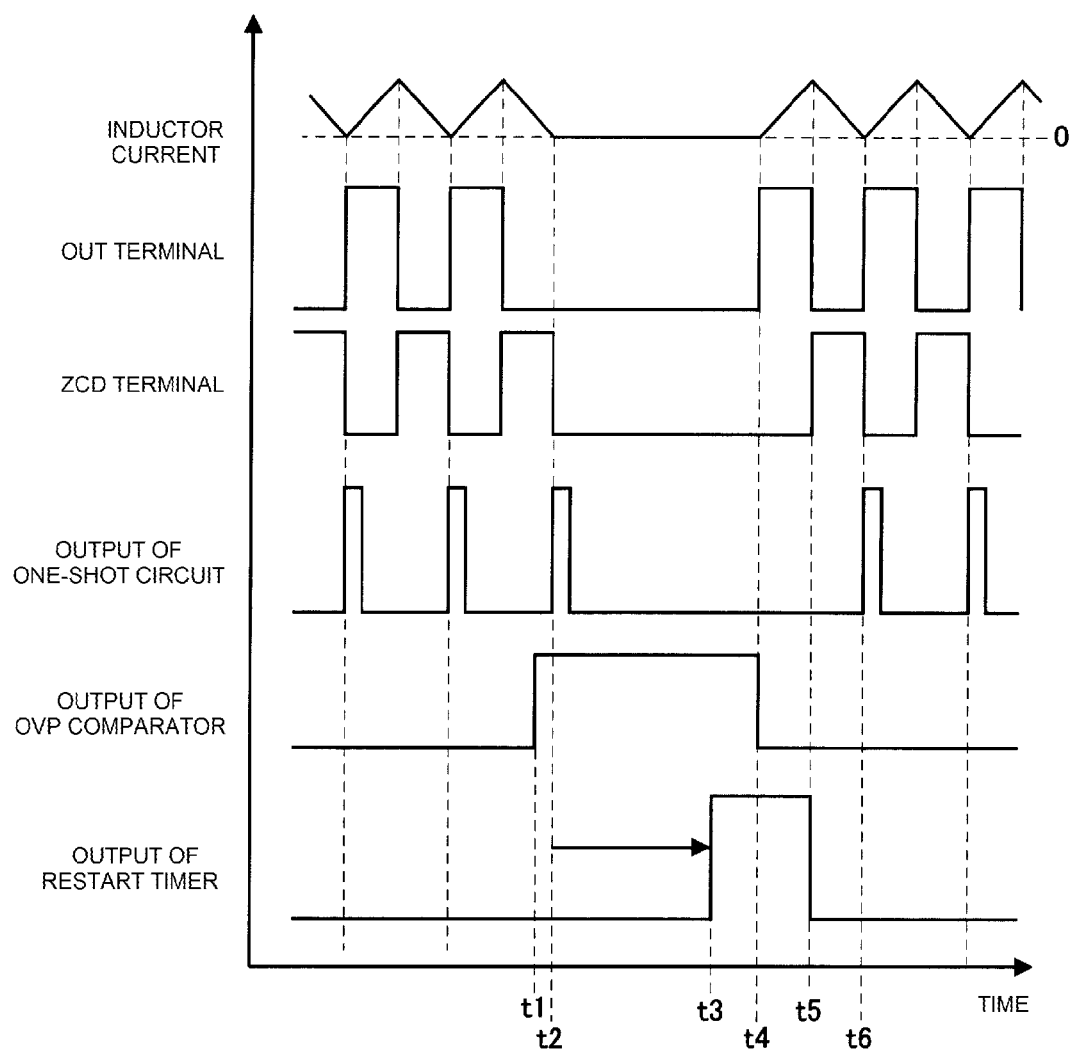
FIG. 11 is a view for explaining an operation when an RS flip-flop is set.
Figure 12:
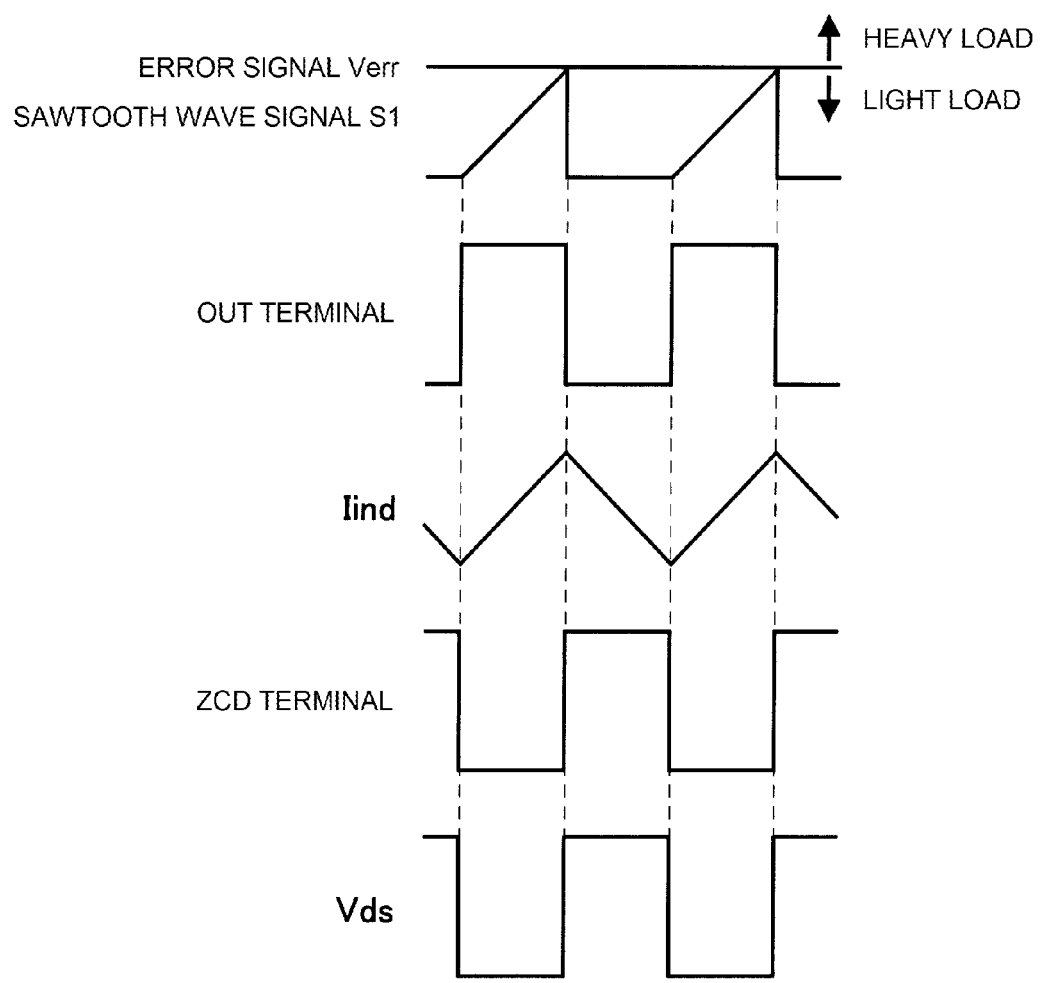
FIG. 12 is a view for explaining an operation when the RS flip-flop is reset.

As shown in FIG. 2, the lamp oscillator 13 has fundamentally the same configuration as that of the circuit according to the background-art example shown in FIG. 10 except that a first charging current changing circuit 30 is newly added in the lamp oscillator 13. That is, the lamp oscillator 13 has a circuit which is constituted by an operational amplifier 1301, a reference voltage source 1302 and an MOSFET 1303 and which outputs a constant voltage to an RT terminal due to virtual short-circuiting of the operational amplifier 1301. The lamp oscillator 13 also has a current mirror circuit which is constituted by MOSFETs 1304 and 1305 and which outputs a current i1 proportional to a current flowing into a timing resistor R1. The lamp oscillator 13 further has a circuit which is constituted by a capacitor 1310 to be charged with the current i1, an MOSFET 1306, an inverter 1307, an MOSFET 1308 and a reference voltage source 1309 and which charges and discharges the capacitor 1310. The lamp oscillator 13 has a first charging current changing circuit 30 which generates a current i2 corresponding to an error signal Verr.

The first charging current changing circuit 30 has a current amplifier (transconductance amplifier) 3001 and a reference voltage source 3002. A non-inverting input of the current amplifier 3001 receives a reference voltage 3002. An inverting input of the current amplifier 3001 receives the error signal Verr. An output of the current amplifier 3001 is connected to a connection point between a drain of the MOSFET 1305 and a source of the MOSFET 1306. The current amplifier 3001 compares the error signal Verr with the reference voltage 3002, converts a differential voltage between the error signal Verr and the reference voltage 3002 into a current, and outputs the converted current. That is, as shown in FIG. 3, when the error signal Verr is lower than the reference voltage 3002, the current amplifier 3001 outputs the current i2. On this occasion, the current i2 increases as the error signal Verr decreases. The current i2 outputted by the current amplifier 3001 is added to the current i1 with which the capacitor 1310 is charged.

Figure 13:
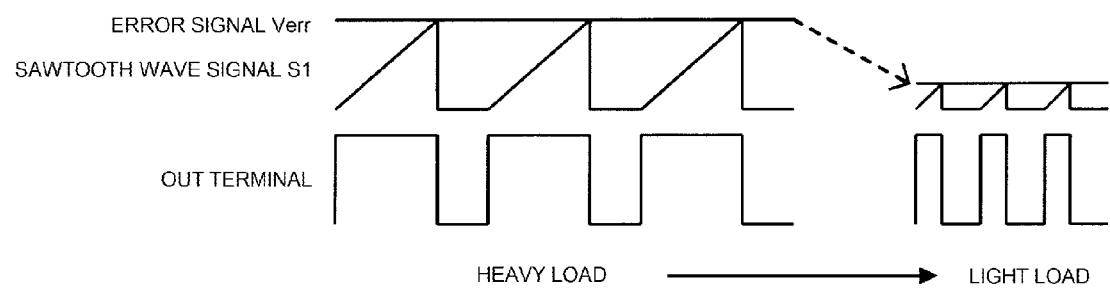
FIG. 13 is a view for explaining the relation between the change of an error signal Verr caused by the change of a load and a signal outputted from an OUT terminal.
Figure 14:
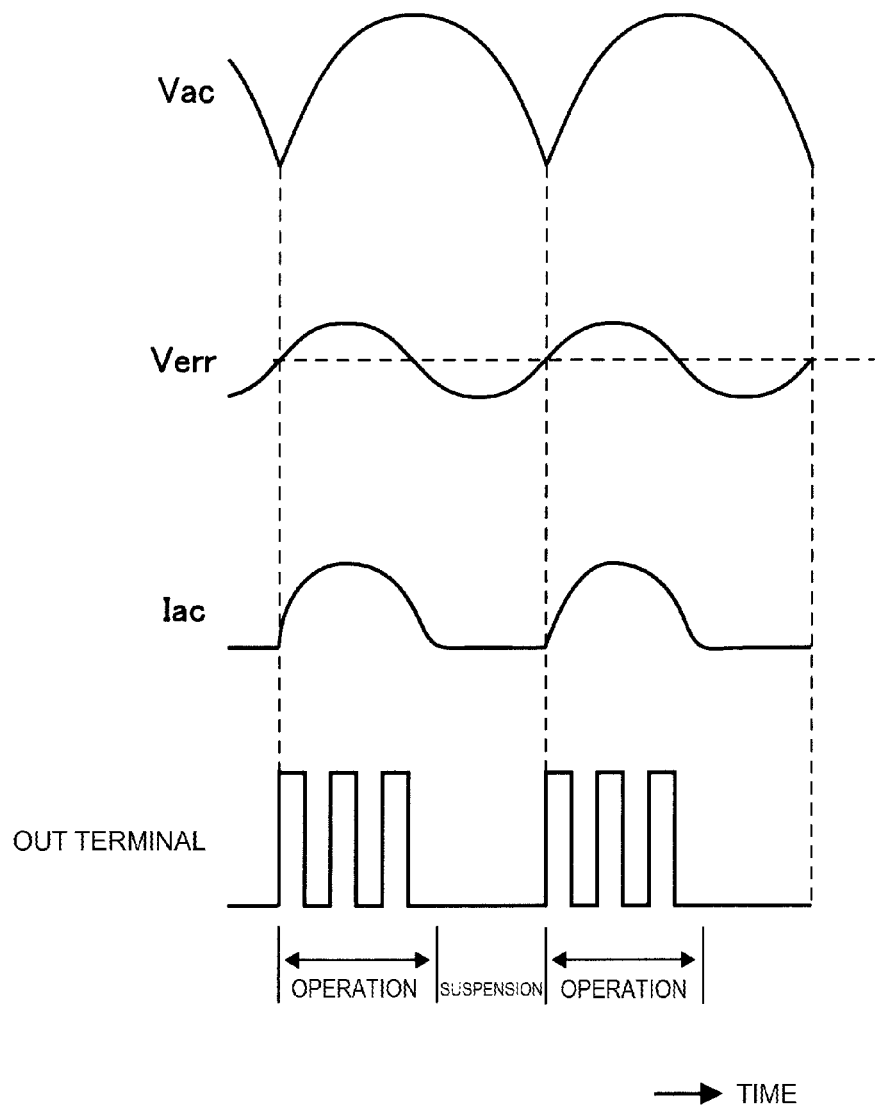
FIG. 14 is a view for explaining factors causing the change of the error signal during a light load.
Figure 15:
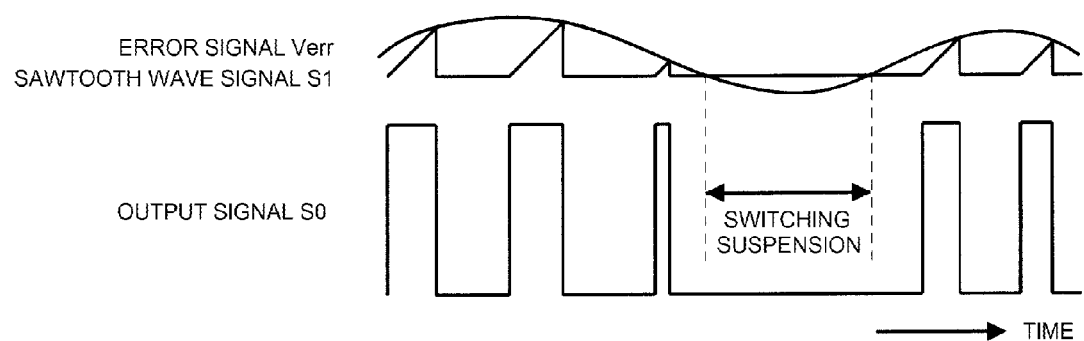
FIG. 15 is a view for explaining the influence caused by the change of the error signal during the light load.

Here, when the error signal Verr is higher than the reference voltage 3002 (the load of the switching power supply circuit is heavy), the current with which the capacitor 1310 is charged is only the current i1. Accordingly, as shown in FIG. 4, the slope of a sawtooth wave signal S1 is the same as that in the background-art case shown in FIG. 13. On the other hand, when the error signal Verr is lower than the reference voltage 3002 (the load of the switching power supply circuit is light), a current obtained by adding the current i2 to the current i1 becomes the current with which the capacitor 1310 is charged. Based on the charging current, a sawtooth wave signal S1 is formed. Therefore, the slope of the sawtooth wave signal S1 is steeper and the gain becomes lower than those when the error signal Verr is higher than the reference voltage 3002 (the load of the switching power supply circuit is heavy).

In addition, when the magnitude of a load connected to an output terminal 7 of the switching power supply circuit is constant, feedback control works to make the ON width of the output transistor 4 constant. Therefore, as shown in FIG. 5, when the slope of the sawtooth wave signal S1 is steep, the error signal Verr can be kept at a higher voltage than that when the slope of the sawtooth wave signal S1 is gentle, in order to obtain the same ON width even under the same load. When the error signal Verr is kept at a high voltage, the error signal Verr is rarely lower than a switching suspension voltage (reference voltage 1309) in spite of the influence from a ripple voltage. That is, the error signal Verr can be substantially prevented from being lower than the switching suspension voltage, so that switching operation can be prevented from being suspended intermittently. Accordingly, the switching power supply circuit can operate stably even under a lighter load.

In addition, since it is not necessary to monitor the input voltage in order to make the operation stable under a light load, it is possible to prevent standby power from deteriorating due to losses in resistors dividing the input voltage and it is possible to prevent the number of pins in a control IC from increasing in order to monitor the input voltage.

Further, the switching power supply circuit is not designed to be optimized to an AC power supply for a 100 V system or an AC power supply for a 240 V system individually but is applied to a switching power supply circuit supporting a wide input voltage range of from 100 V to 240 V. That is, the switching power supply circuit can make control under a heavy load without any problem in any of the 100 V system and the 240 V system. In addition, the switching power supply circuit can stabilize unstable operation which may occur under a light load with a high input voltage.

Figure 6:
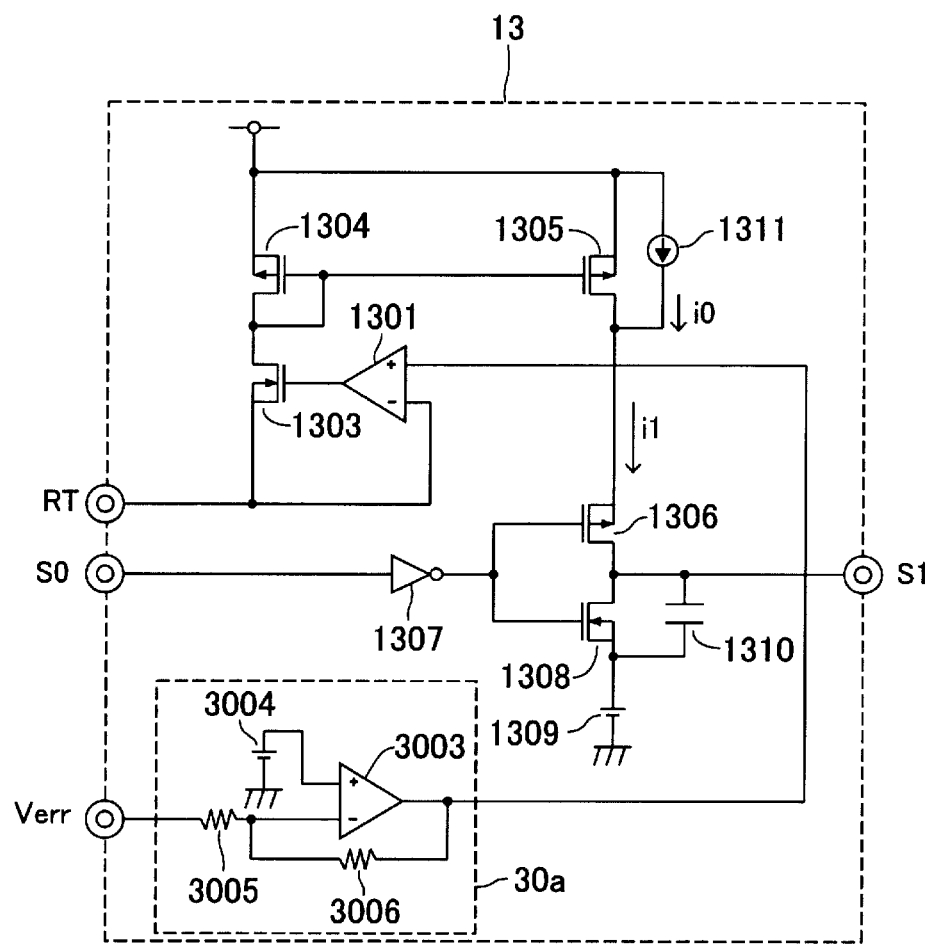
FIG. 6 is a circuit diagram showing a configuration example of a lamp oscillator of the switching power supply circuit according to a second embodiment.
Figure 7:
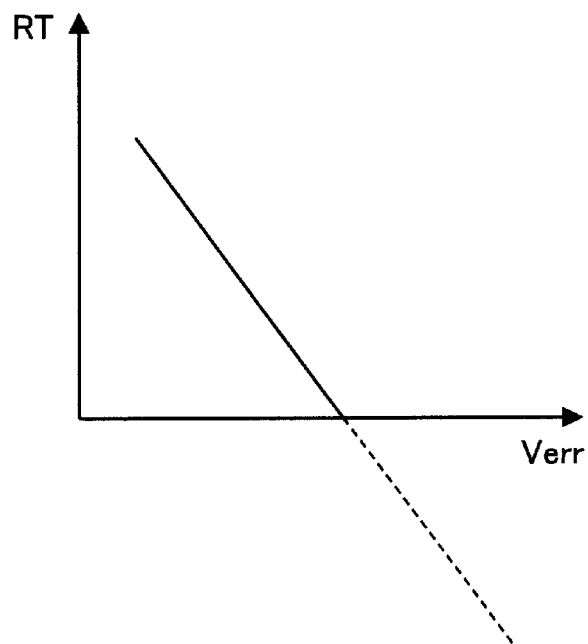
FIG. 7 is a graph showing a characteristic of a charging current changing circuit of the lamp oscillator.

FIG. 6 is a circuit diagram showing a configuration example of a lamp oscillator of the switching power supply circuit according to a second embodiment. FIG. 7 is a graph showing a characteristic of a charging current changing circuit of the lamp oscillator.

As shown in FIG. 6, in the lamp oscillator 13 of the switching power supply circuit according to the second embodiment, the reference voltage 1302 in the circuit according to the background-art example shown in FIG. 10 is replaced by a second charging current changing circuit 30a. Further, a constant current source 1311 connected in parallel with an MOSFET 1305 is added in the lamp oscillator 13.

The second charging current changing circuit 30a has an operational amplifier 3003, a reference voltage source 3004 and resistors 3005 and 3006, which form an inverting amplifier circuit. That is, a reference voltage 3004 is supplied to a non-inverting input of the operational amplifier 3003. An error signal Verr is supplied to an inverting input of the operational amplifier 3003 through the resistor 3005. The resistor 3006 is provided between the inverting input and an output of the operational amplifier 3003. The output of the operational amplifier 3003 is connected to a non-inverting input of an operational amplifier 1301. Here, the reference voltage 3004 is set so that the output of the operational amplifier 3003 can take a positive voltage till the error signal Verr steps up to a predetermined value. In addition, in a region in which the error signal Verr exceeds the predetermined value to make an inverted and amplified signal negative, the reference voltage 3004 is set at a voltage by which the output of the operational amplifier 3003 can be made zero (no negative voltage power supply to the operational amplifier 3003), that is, so that the voltage of an RT terminal can change the slope of a sawtooth wave signal S1.

Thus, when the load is heavy and the error signal Verr is larger than the predetermined value, the output of the operational amplifier 3003 becomes zero. Accordingly, the voltage which the operational amplifier 1301 and the MOSFET 1303 output to the RT terminal also becomes zero. In this case, a current flowing into a timing resistor R1 becomes zero. Accordingly, a current i1 with which a capacitor 1310 is charged becomes only a current i0 of the constant current source 1311.

When the load becomes light and the error signal Verr becomes smaller than the predetermined value, the output of the operational amplifier 3003 also increases accordingly. The voltage outputted to the RT terminal steps up, as shown in FIG. 7. A resistance value of the timing resistor R1 connected to the RT terminal is constant. Accordingly, when the voltage of the RT terminal steps up, the current of the RT terminal increases and a current passing through a current mirror circuit constituted by MOSFETs 1304 and 1305 also increases. The current i1 with which the capacitor 1310 is charged takes a value obtained by adding the current i0 of the constant current source 1311 to the increasing current passing through the current mirror circuit. Accordingly, when the load is light, the slope of the sawtooth wave signal S1 to be outputted is so steep that the lamp oscillator 13 can obtain a similar effect to that in the case of the first embodiment. On the contrary, when the load is heavy, the sawtooth wave signal S1 is generated by the constant current consisting of only the current i0 in the lamp oscillator 13.

Incidentally, it is desirable that the power factor controller circuit 10 in FIG. 1 further provides an overshoot reducing function by which overshoot of an output voltage at the startup time of the switching power supply circuit can be reduced. The overshoot reducing function will be described below.

Figure 8:
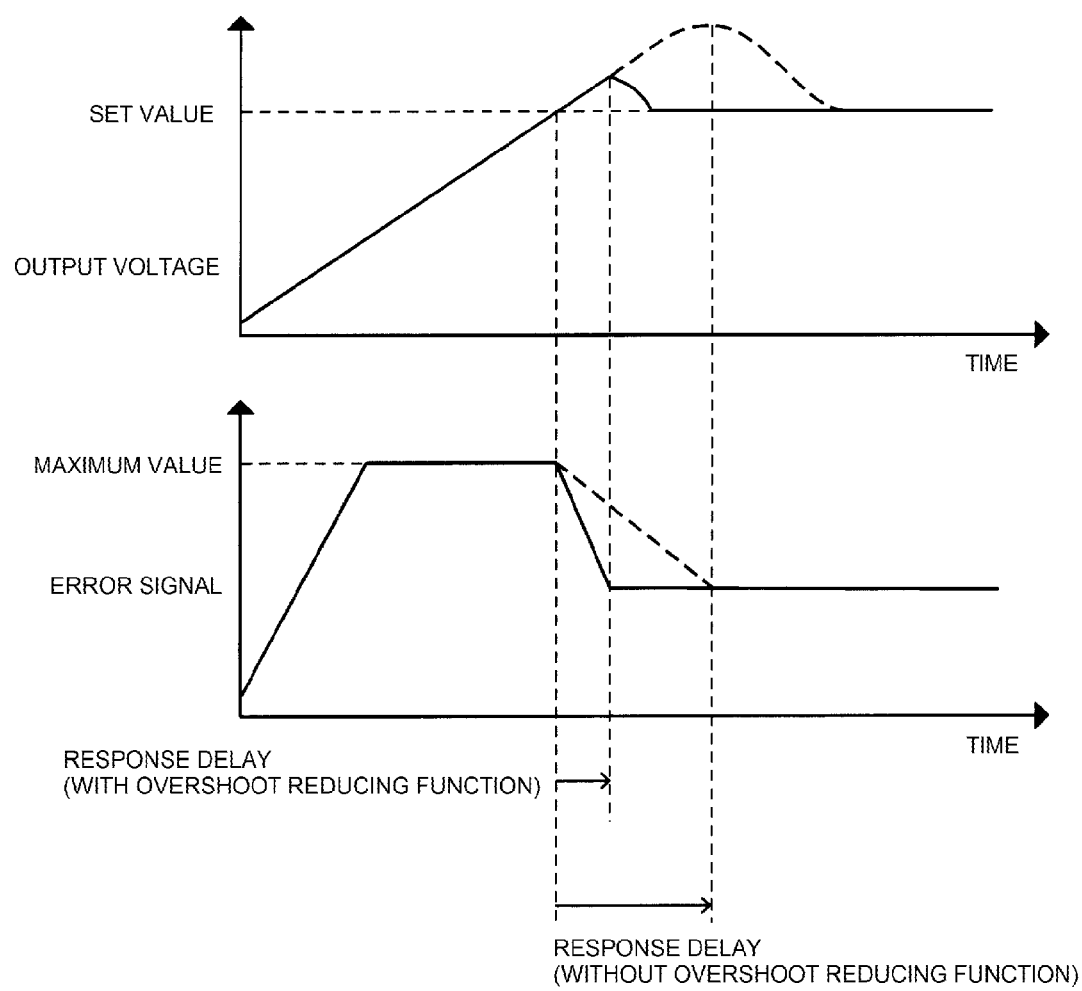
FIG. 8 is a view for explaining an overshoot reducing function.

FIG. 8 is a view for explaining the overshoot reducing function.

The power factor controller circuit 10 sets response of output voltage control to be slow enough to reduce a ripple of an output voltage occurring at a frequency of an AC input voltage. Specifically, a time constant of phase compensation made by a phase compensation element connected to the COMP terminal is set to be large. However, when the response is slow, overshoot of the output voltage occurs at the startup time. Further, recently, in order to reduce the cost of the power supply, an electric field capacitor having no withstand voltage margin against practical use conditions is often connected to the output of the power factor controller circuit 10. In this case, a temporary overvoltage caused by the overshoot at the startup time is applied to the output electric field capacitor to thereby shorten the life thereof.

Therefore, the power factor controller circuit 10 may include a function to temporarily quicken responsiveness to reduce the overshoot of the output voltage when the output voltage reaches a set voltage at the startup time of the switching power supply circuit. The overshoot reducing function can be implemented by a circuit which is provided to forcibly pull down the error signal Verr to a value corresponding to the load when, for example, the output voltage reaches the set value immediately after the startup.

Here, the power factor controller circuit 10 supplies larger electric power to the output as the error signal Verr is higher. At the startup time, large electric power is required to step up the output voltage to the set value. Accordingly, as shown in FIG. 8, the error signal Verr steps up to a maximum value. If the power factor controller circuit 10 does not have the overshoot reducing function, the response of the output voltage control will be set to be slow. Accordingly, even when the output voltage reaches the set value, the decrease of the error signal Verr will be delayed to result in excessive supply of electric power. Consequently, the output voltage will be overshot.

On the other hand, if the power factor controller circuit 10 has the overshoot reducing function, the error signal Verr will be forcibly pulled down as soon as the output voltage reaches the set value. Accordingly, the response delay will be reduced and the overshoot at the startup time will be reduced. Thus, an output electric field capacitor low in withstand voltage can be used safely.

What is claimed is:

1. A switching power supply circuit for obtaining a predetermined DC (direct current) output voltage from an AC (alternating current) power supply, the circuit comprising:
    a full-wave rectifier configured to perform full-wave rectification on an AC provided by the AC power supply;
    an inductor, one end thereof being connected to an output terminal of the full-wave rectifier;
    an output transistor connected between the other end of the inductor and a reference potential;
    a DC voltage generating circuit configured to rectify and smooth a current output from the other end of the inductor, so as to generate the predetermined DC output voltage; and
    a power factor controller circuit configured to control an ON time of the output transistor based on an error signal obtained by amplifying a differential voltage between a feedback voltage indicating the magnitude of the DC output voltage and a first reference voltage, the power factor controller circuit including an oscillator configured to generate a sawtooth wave signal to be compared with the error signal in order to control the ON time, the oscillator having a charging current changing circuit configured to increase a charging current for generating the sawtooth wave signal as the error signal decreases, wherein:
    the charging current changing circuit includes a resistor and an inverting amplifier circuit; and
    the charging current changing circuit is configured to apply, to the resistor, a signal obtained by inverting and amplifying the error signal by the inverting amplifier circuit, and to generate the charging current based on a current flowing into the resistor.

2. The switching power supply circuit according to claim 1, wherein:
the charging current changing circuit has a current amplifier configured to convert a differential voltage between a second reference voltage and the error signal into a current, and to output the converted current.

3. The switching power supply circuit according to claim 1, wherein:
the second reference voltage is a voltage for determining a point at which a slope of the sawtooth wave signal has to be changed.

4. The switching power supply circuit according to claim 1, wherein:
the inverting amplifier circuit receives a third reference voltage for comparison with the error signal.

5. The switching power supply circuit according to claim 4, wherein:
the oscillator has a constant current source for generating the sawtooth wave signal when the error signal is higher than the third reference voltage.

6. The switching power supply circuit according to claim 1, wherein: the AC power supply is a power supply having a voltage that has a range of 100 V to 240V.

7. A power factor controller circuit for controlling a switching power supply circuit, to thereby generate a DC (direct current) output voltage from an AC (alternating current) power supply, the switching power supply circuit including
an inductor, one end thereof being configured to receive a full-wave rectified AC,
an output transistor connected between the other end of the inductor and a reference potential, and
a DC voltage generating circuit configured to rectify and smooth a current output from the other end of the inductor, to thereby generate the output voltage, the power factor controller circuit comprising:
an amplifier configured to receive a first reference voltage and a feedback voltage indicating the magnitude of the DC output voltage, and
amplify a differential voltage between the feedback voltage and the first reference voltage, to thereby generate an error signal;
an oscillator configured to receive the error signal and to generate a sawtooth wave signal, the oscillator including
a capacitor chargeable by a charging current to thereby generate the sawtooth wave signal, and
a charging current changing circuit configured to increase the charging current in proportion to a decrease of the error signal control the oscillator in accordance with the error signal, so that the sawtooth wave signal has a steep slope; and
a comparator configured to compare the sawtooth wave signal with the error signal, to thereby control an ON time of the output transistor, wherein
the charging current changing circuit includes a resistor and an inverting amplifier circuit, and
the charging current changing circuit is configured to apply, to the resistor, a signal obtained by inverting and amplifying the error signal by the inverting amplifier circuit, and to generate the charging current based on a current flowing into the resistor.

* * * * *